(12) United States Patent
You

(10) Patent No.: US 12,342,234 B2
(45) Date of Patent: Jun. 24, 2025

(54) HANDOVER RELATED INFORMATION PROCESSING METHOD AND TERMINAL DEVICE

(71) Applicant: GUANGDONG OPPO MOBILE TELECOMMUNICATIONS CORP., LTD., Guangdong (CN)

(72) Inventor: Xin You, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 441 days.

(21) Appl. No.: 17/651,634

(22) Filed: Feb. 18, 2022

(65) Prior Publication Data

US 2022/0174558 A1    Jun. 2, 2022

Related U.S. Application Data

(63) Continuation of application No. PCT/CN2019/102085, filed on Aug. 22, 2019.

(51) Int. Cl.
*H04W 36/18* (2009.01)
*H04W 36/00* (2009.01)
*H04W 36/08* (2009.01)

(52) U.S. Cl.
CPC ..... *H04W 36/185* (2023.05); *H04W 36/0064* (2023.05); *H04W 36/0069* (2018.08); *H04W 36/08* (2013.01)

(58) Field of Classification Search
None
See application file for complete search history.

(56) References Cited

U.S. PATENT DOCUMENTS

| 2020/0022046 | A1 | 1/2020 | Wang et al. |
| 2021/0160798 | A1* | 5/2021 | Zheng ............ H04W 24/10 |
| 2021/0345205 | A1* | 11/2021 | Persson ........ H04W 36/0011 |
| 2022/0022121 | A1* | 1/2022 | Eklöf ............ H04W 36/087 |
| 2022/0217594 | A1* | 7/2022 | Kim ............ H04W 36/185 |

FOREIGN PATENT DOCUMENTS

| CN | 103582044 A | 2/2014 |
| CN | 104219717 A | 12/2014 |
| CN | 104581696 A | 4/2015 |

(Continued)

OTHER PUBLICATIONS

First Office Action of the Chinese application No. 201980093364.X, issued on Feb. 3, 2024, 15 pages with English translation.

(Continued)

*Primary Examiner* — Saad Khawar
(74) *Attorney, Agent, or Firm* — PERKINS COIE LLP

(57) ABSTRACT

Provided are an information processing method, a terminal device, a chip, a computer-readable storage medium, a computer program product and a computer program. The method includes that: a terminal device receives a handover command which is used for configuring the terminal device to perform handover during which connections with a source network device and a target network device are both maintained; and the terminal device does not send uplink control information to the source network device.

8 Claims, 10 Drawing Sheets

(56) References Cited

FOREIGN PATENT DOCUMENTS

| CN | 106993313 A | 7/2017 |
|---|---|---|
| CN | 107659970 A | 2/2018 |
| CN | 107690163 A | 2/2018 |
| CN | 108632934 A | 10/2018 |
| CN | 110099417 A | 8/2019 |
| EP | 2884803 A1 | 6/2015 |
| WO | 2019064074 A1 | 4/2019 |

OTHER PUBLICATIONS

International Search Report in the international application No. PCT/CN2019/102085, mailed on May 21, 2020.
Intel Corporation et al, "Control plane consideration for dual active protocol stack (DAPS) based LTE enhanced MBB HO", 3GPP TSG-RAN WG2 #107 R2-1910383, Prague, Czech Republic, Aug. 26-30, 2019. 6 pages.
Nokia et al, "RLM and HOF detection in Dual Active Protocol Stack Operation", 3GPP TSG RAN WG2 Meeting #107 R2-1909038, Prague, Czech Republic, Aug. 26-30, 2019. 3 pages.
LG Electronics, "Control of control plane connectivity for eMBB", 3GPP TSG-RAN WG2 Meeting #107 R2-1911474, Prague, Czeck, Aug. 26-30, 2019. 2 pages.
Supplementary European Search Report in the European application No. 19942099.3, mailed on Jul. 8, 2022. 9 pages.
Written Opinion of the International Search Authority in the international application No. PCT/CN2019/102085, mailed on May 21, 2020. 6 pages with English translation.
Oppo, "Further details on dual active protocol stack", 3GPP TSG-RAN WG2 Meeting #107 R2-1909670, Prague, Czech, Aug. 26-Aug. 30, 2019, cited in the whole document. 4 pages.
Nokia et al, "On PUSCH Switch in Dual Active Protocol Stack", 3GPP TSG-RAN WG2 Meeting #107 R2-1909033, Prague, Czech Republic, Aug. 26-30, 2019, cited in the whole document. 4 pages.
First Office Action of the European application No. 19942099.3, issued on Jun. 21, 2023. 14 pages.
Second Office Action of the Chinese application No. 201980093364.X, issued on Aug. 14, 2024, 14 pages with English translation.

* cited by examiner

HANDOVER RELATED INFORMATION PROCESSING METHOD AND TERMINAL DEVICE

CROSS-REFERENCE TO RELATED APPLICATION

This application is a continuation of International Patent Application No. PCT/CN2019/102085 filed on Aug. 22, 2019, the content of which is incorporated herein by reference in its entirety.

TECHNICAL FIELD

The disclosure relates to the technical field of information processing, and in particular to an information processing method, a terminal device, a chip, a computer-readable storage medium, a computer program product and a computer program.

BACKGROUND

In the conventional art, when receiving a Handover (HO) command, a terminal device may release a connection with a source cell and establish a connection with a target cell through random access. For handover during which connections with a source network device and a target network device are both maintained, a terminal device may retain, when receiving a HO command, a related configuration from the source network device until the connection with the source network device is released. However, when the connections with the two network devices are both maintained, power consumption of the terminal device may be not reduced.

SUMMARY

In a first aspect, an information processing method is provided, which is implemented by a terminal device and may include the following operations.

A terminal device receives an HO command for configuring the terminal device to perform handover during which connections with a source network device and a target network device are both maintained.

The terminal device does not send Uplink (UL) control information to the source network device.

In a second aspect, a terminal device is provided, which may include: a communication unit.

The communication unit is configured to receive an HO command for configuring the terminal device to perform handover during which connections with a source network device and a target network device are both maintained, and not send UL control information to the source network device.

In a third aspect, a terminal device is provided, which may include a processor and a memory. The memory may be configured to store a computer program. The processor may be configured to call and run the computer program stored in the memory and perform the method in the first aspect or each implementation mode thereof.

In a fourth aspect, a chip is provided, which may be configured to implement the method in each implementation mode.

Specifically, the chip may include a processor, configured to call and run the computer program in the memory to cause a device installed with the chip to perform the method in the first aspect or each implementation mode thereof.

In a fifth aspect, a computer-readable storage medium is provided, which may be configured to store a computer program. The computer program enables a computer to perform the method in the first aspect or each implementation mode thereof.

In a sixth aspect, a computer program product is provided, which may include a computer program instruction. The computer program instruction enables a computer to perform the method in the first aspect or each implementation mode thereof.

In a seventh aspect, a computer program is provided, which may enable, when running on the computer, the computer to perform the method in the first aspect or each implementation mode thereof.

Based on the above solutions, a terminal device can be controlled to not send UL control information to a source network device when performing handover during which connections with a source network device and a target network device are both maintained. In this way, the power consumption of the terminal device can be reduced by reducing the information sent to the source network device during handover.

DETAILED DESCRIPTION

In order to understand characteristics and technical contents in the embodiments of the disclosure in more detail, the implementation of the embodiments of the disclosure is elaborated in combination with the accompanying drawings. The accompanying drawings are only used for reference, but not intended to limit the embodiments of the disclosure.

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

The technical solutions of the embodiments of the disclosure may be implemented by various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a 5G system.

Figure 1:
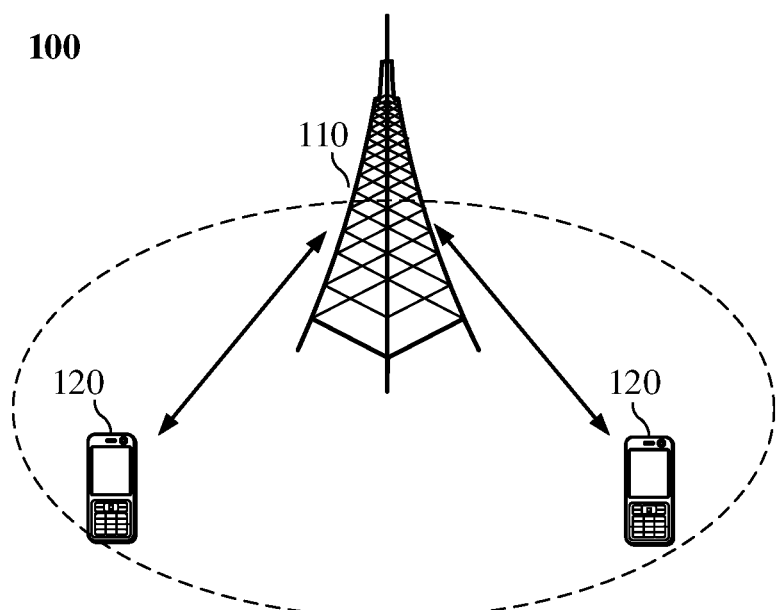
FIG. 1 is a first schematic diagram of a communication system architecture provided by an embodiment of the disclosure.

Exemplarily, a communication system 100 that the embodiments of the disclosure are applied to may be shown in FIG. 1. The communication system 100 may include a network device 110, and the network device 110 may be a device communicating with a UE 120 (or called a communication terminal or a terminal). The network device 110 may provide communication coverage for a specific geographical region and may communicate with a UE located in the coverage. Optionally, the network device 110 may be a Base Transceiver Station (BTS) in a GSM or a CDMA system, may also be a NodeB (NB) in a WCDMA system, or may be an Evolutional Node B (eNB or eNodeB) in an LTE system or a wireless controller in a Cloud Radio Access Network (CRAN). Or the network device may be a mobile handover center, a relay station, an access point, a vehicle device, a wearable device, a hub, a switch, a network bridge, a router, a network-side device in a 5G network, a network device in a future evolved Public Land Mobile Network (PLMN) or the like.

The communication system 100 may further include at least one UE 120 within the coverage of the network device 110. The "UE" used herein includes, but not limited to, a device configured to receive/send a communication signal through a wired line connection, for example, through Public Switched Telephone Network (PSTN), Digital Subscriber Line (DSL), digital cable and direct cable connections, and/or another data connection/network) and/or through a wireless interface, for example, for a cellular network, a Wireless Local Area Network (WLAN), a digital television network like a Digital Video Broadcasting-Handheld (DVB-H) network, a satellite network and an Amplitude Modulated (AM)-Frequency Modulated (FM) broadcast transmitter, and/or another UE, and/or an Internet of Things (IoT) device. The UE configured to communicate through a wireless interface may be called a "wireless communication terminal", a "wireless terminal" or a "mobile terminal."

Optionally, Device to Device (D2D) communication may be performed between UEs 120.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

In order to understand characteristics and technical contents in the embodiments of the disclosure in more detail, the implementation of the embodiments of the disclosure is elaborated in combination with the accompanying drawings. The accompanying drawings are only used for reference, but not intended to limit the embodiments of the disclosure.

Figure 2:
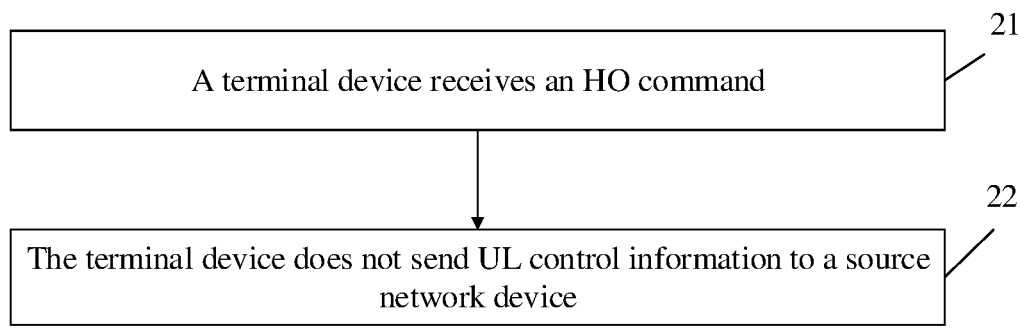
FIG. 2 is a first flowchart of an information processing method provided by an embodiment of the disclosure.

An embodiment of the disclosure provides an information processing method, which is implemented by a terminal device. As shown in FIG. 2, the method may include the following operations.

At operation 21, a terminal device receives an HO command for configuring the terminal device to perform handover during which connections with a source network device and a target network device are both maintained.

At operation 22, the terminal device does not send UL control information to the source network device.

The UL control information may include at least one of the following: a measurement report, and a radio resource control (RRC) message uploaded through a dedicated control channel (DCCH).

In the embodiment, the network device may be a base station on the network side, the source network device may be a source base station connected to the terminal device, and the target network device may be a target base station. The terminal device is a device that can maintain connections with both the source network device and the target network device.

First, a scenario for the embodiment is described. Similar to an LTE system, a New Radio (NR) system supports a handover of a connected terminal device. When the terminal device that is using network service is moved from one cell to another cell, or adjustment of wireless traffic load, maintenance of activation, device fault and the like take place, in order to ensure the continuity of communication and quality of service, the system is required to transfer a communication link between the terminal device and the original cell to a new cell, that is, performing a handover. A handover corresponding to a handover through an Xn interface is taken as an example. The whole handover process is divided into the following three phases, as shown in FIG. 3, including: a handover preparation phase, a handover execution phase, and a handover completion phase.

Figure 3:
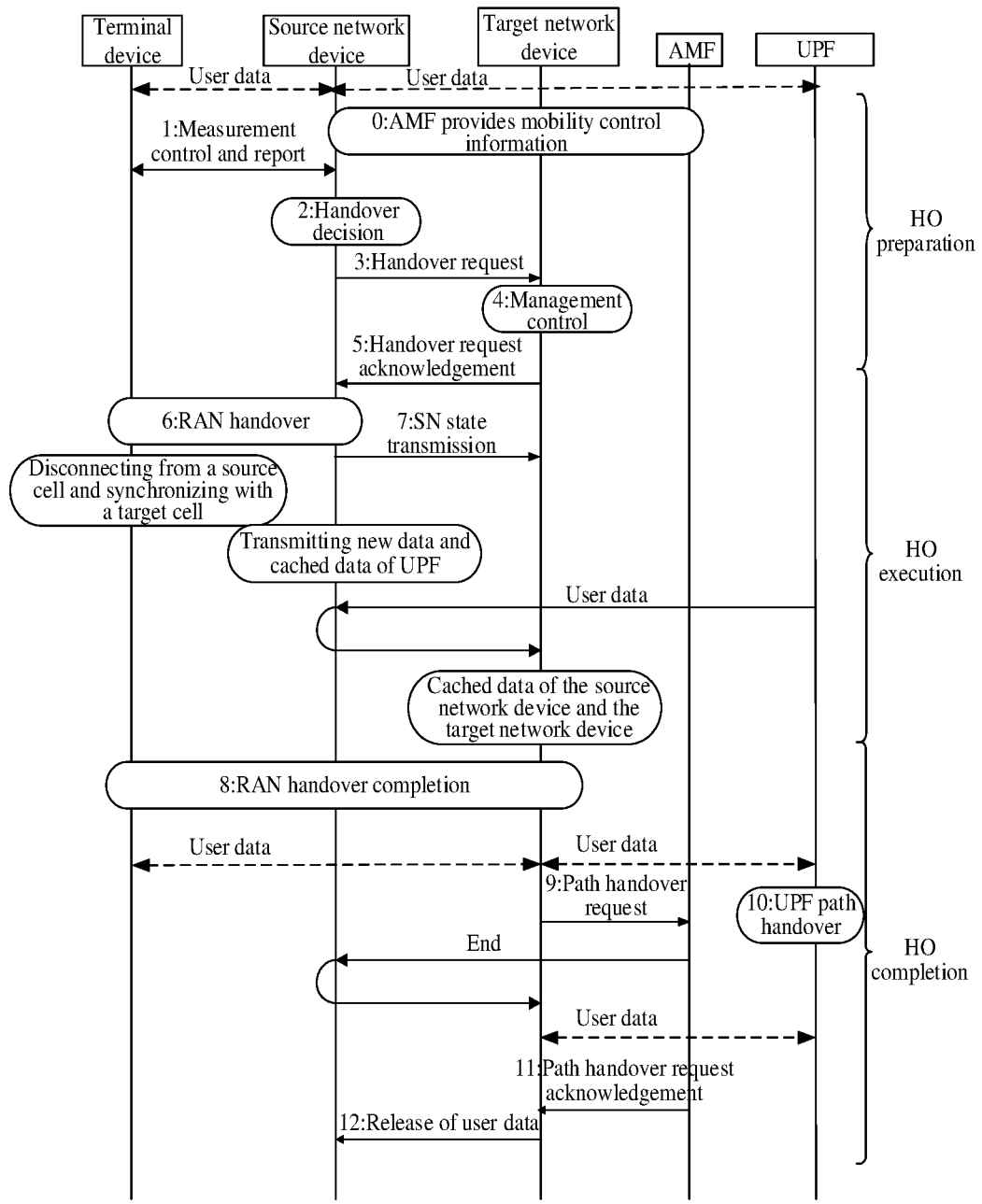
FIG. 3 is a flowchart of handover.

In the handover preparation phase, as shown in the operations 0-5 in FIG. 3, processing is performed by the target network device and the source network device according to mobility control information provided by Access and Mobility Management Function entity (AMF). The terminal device performs measurement control and reporting, the source network device makes a handover decision, and then a handover request, a management control, and a handover request acknowledgment are performed by the source network device to the target network device. A handover acknowledgment message includes an HO command generated by the target cell, the source network device is not allowed to make any modification to the HO command generated by the target network device, and the HO command is directly forwarded to the terminal device.

In the handover preparation phase, as shown the operations in 6-7 in FIG. 3, the terminal device performs the handover immediately after receiving the HO command. The handover process may include that: the terminal device and the source network device perform a Radio Access Network (RAN) handover, the terminal device performing the handover is disconnected from the source cell, synchronizes with the target cell, and establishes a connection with the target cell (such as performing random access and sending a handover completion message to the target base station); and an SN state is transferred. The handover may also include that: the source network device transmits new data of User Plane Function (UPF), and transmits cached data to the target network device.

In the handover completion phase, as shown in the operations 8-12 in FIG. 3, after the RAN handover is completed, user data is transmitted between the terminal device and the target network device and the user data is transmitted between the target network device and the UPF; the target network device and the AMF send a path handover request, the UPF performs a path handover, and then the AMF notifies the target network device of completion of the path handover through the source network device; the AMF sends a path handover request acknowledgment to the target network device, and then the target network device notifies the source network device to release user data.

In addition, another handover scenario corresponding to the embodiment may also include the following two architectures.

An architecture is a handover based on dual connections. In this case, during the handover, the target network device may be first added as a Secondary Node (SN), then the SN may be changed to a Master Node (MN) through role conversion signaling, and finally the source network device may be released, so as to achieve the effect of reducing the interruption time during the handover.

The other architecture is a handover during which connections with a source network device and a target network device are both maintained, which may be understood as an Enhanced make-Before-Break (eMBB) handover. The handover is different the handover during which, when receiving the HO command, the terminal device initiates random access to the target network device while keeping the connection with the source network device until the terminal device is connected to the target network device.

Further, the following restrictions may be added: first, in a Oms handover, there is no need to simultaneously support UL Physical Uplink Shared Channel (PUSCH) transmission; and second, after first UL grant sent by the target network device (that is, the target base station) is received, the UL PUSCH is switched to the target network device from the source network device.

In an embodiment, the operation that the terminal device does not send the UL control information to the source network device may further include that:

in response to preset condition being met, the terminal device does not send the UL control information to the source network device.

The preset condition may include that: an UL of the terminal device is switched to the target network device.

The above is applied to a situation where after the first UL grant sent by the target network device (that is, the target base station) is received, the UL PUSCH is switched to the target network device from the source network device.

Specifically, after the terminal device receives the HO command, the method may further include that:

the terminal device accesses the target network device based on the HO command, and maintains the reception and transmission of data between the terminal device and the source network device.

in response to the preset condition being not met, the terminal device keeps sending the UL control information to the source network device based on a configuration from the source network device for report triggering.

That is, after the HO command is sent to the terminal device, and before receiving the UL grant sent by the target network device, the terminal device only keeps the UL with the source network device, but does not establish an UL with the target network device. In this case, when the preset condition is not met, the terminal device may keep sending the UL control information to the source network device.

The configuration from the source network device for report triggering may include a measurement configuration. Correspondingly, the UL control information may at least include a measurement report.

The UL control information reported by triggering based on the configuration for report triggering may be carried by a DCCH logical channel or Signaling Radio Bearer (SRB) 1 or SRB3.

Further, when the terminal device meets the preset condition, that is, the UL of the terminal device is switched to the target network device, the terminal device does not send the UL control information to the source network device.

That is, after receiving an UL granted resource from the target network device, the terminal device may disconnect from the source network device, and switch the UL to the target network device. At this moment, the terminal device may be controlled to not send the UL control information to the source network device.

The UL control information may include at least one of the followings: a measurement report, and an RRC message uploaded through a DCCH. The operation that the RRC message is not transmitted on the DCCH may be that UE assistance information is not transmitted, and so on. Other examples are omitted here.

As an example, the operation that the terminal device does not send the UL control information to the source network device has several possible implementation modes as follows.

In a first implementation mode, the configuration from the source network device for report triggering is deleted, for example, the measurement configuration configured by the source network device is deleted. It should be pointed out that deletion may be performed after the UL of the terminal device is switched to the target network device. In a possible example under this mode, all of the configurations for report triggering may be deleted after the UL of the terminal device is switched to the target network device. In another example, part of the configurations for report triggering may be deleted after the UL of the terminal device is switched to the target network device, for example, if the configurations for report triggering include configurations for multiple cells, the configurations for part of the cells may be deleted. Taking the measurement configuration included in the configurations for report triggering for example, the measurement configuration may include multiple measurement IDs, a measurement object configuration, and so on, only the configurations corresponding to part of the measurement IDs may be deleted. Of course, there may be other examples, and any example that can delete only part of the configurations is in the protection scope of the above processing.

In a second implementation mode, the configuration from the source network device for report triggering is retained, but the corresponding UL control information is not generated, or the UL control information is generated but not sent. In a possible example under this mode, all reports triggered by the configuration for report triggering may be controlled to be not generated or sent. In another example, the UL control information reported and triggered by part of the configurations for report triggering may be controlled to be not generated or sent, for example, only the UL control information triggered by the configuration for some cells for report triggering is not generated or sent. Taking that the configuration for report triggering is the measurement configuration for example, measurement reporting triggered in some ID measurements may be controlled to be not generated or sent. Of course, there may be other examples, and any example in which the UL control information triggered only by part of the configurations is not generated or sent is in the protection scope of the above processing.

In a third implementation mode, the configuration from the source network device for report triggering is retained, but after the UL of the terminal device is switched to the target network device, the configuration from the source network device for report triggering may be controlled to be deactivated, disabled or laid up. In this way, it can also be ensured that the configuration for report triggering is not performed, thereby ensuring that the UL control information is not generated, that is, the measurement report is not generated. In a possible example under this mode, after the UL of the terminal device is switched to the target network device, all of the configurations from the source network device for report triggering may be controlled to be deactivated, disabled or laid up. In another example, only part of the configurations for report triggering may be deactivated, disabled or laid up after the UL of the terminal device is switched to the target network device, for example, when the configurations of report triggering include configurations for multiple cells, the configurations for part of the cells may be deactivated, disabled or laid up. Taking the measurement configuration included in the configurations for report triggering for example, the measurement configuration may include multiple measurement IDs, the measurement object configuration, and so on, and only the configurations corresponding to part of the measurement IDs may be deactivated, disabled or laid up. Of course, there may be other examples, and any example that can deactivate, disable or lay up only part of the configurations is in the protection scope of the above processing.

Figure 4:
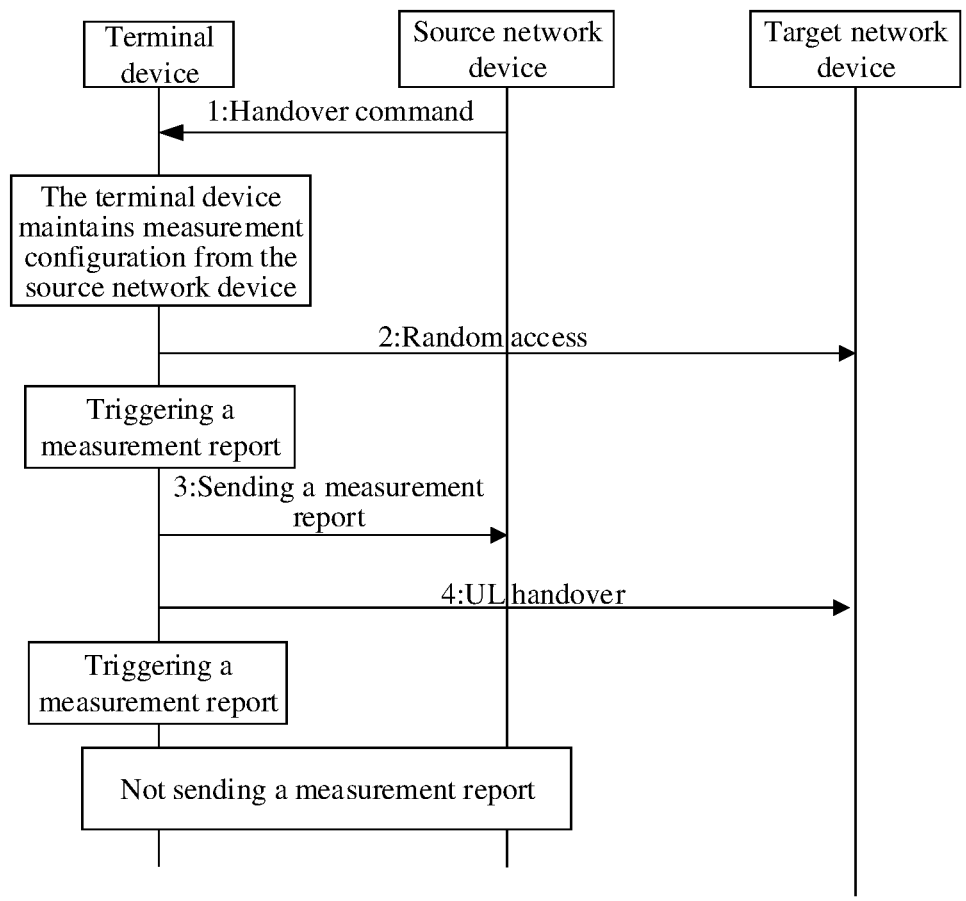
FIG. 4 is a second flowchart of an information processing method provided by an embodiment of the disclosure.

As shown in FIG. 4, taking the measurement configuration included in the configurations from the source network device for report triggering for example, an example includes the following operations.

First, the terminal device receives an HO command which is used for configuring the terminal device to perform dual active stack handover (that is, maintaining the connections with the target network device and the source network device, or being an eMBB handover). In this case, the terminal device may retain the measurement configuration from the source network device, and keep performing a corresponding RRM measurement based on the configuration from the source network device.

Second, a random access is initiated to the target network device.

Third, in response to determining, based on the measurement configuration configured by the source network device, that a measurement event is satisfied and a measurement report is triggered, the terminal device generates and sends the measurement report to the source network device.

Fourth, the UL of the terminal device is switched to the target network device; at this moment, the terminal device stops sending UL data carried through the PUSCH to the source cell, and the terminal device does not perform the measurement configuration from the source network device, or does not generate or send the measurement report; at the same time, the terminal device stops any RRC message uploaded using the SRB1/2/3 (that is, the DCCH), for example, the UE assistance information. FIG. 4 shows a situation where the measurement report is triggered based on the measurement configuration configured by the source network device, but the measurement report is not sent to the source network device.

In an embodiment, after receiving the HO command, the terminal device deletes the configuration from the source network device for report triggering.

That is, once the HO command is received, the configurations for report triggering from the source network device, which may include the measurement configuration, may be deleted. In this way, since these configurations are deleted, the terminal device does not send the related UL control information to the source network device based on these configurations, thereby avoiding sending the measurement report.

It is to be noted that the UL control information reported based on the configuration for report triggering may be carried by the DCCH logical channel or the SRB 1 or SRB3.

In addition, the terminal device may also control to not send the RRC message, which may include the UE assistance information, etc., to the source network device through the DCCH.

In a possible processing mode, all of the configurations for report triggering may be deleted. In another mode, part of the configurations for report triggering may be deleted, for example, if the configurations for report triggering include the configurations for multiple cells, the configurations for part of the cells may be deleted. Taking the measurement configuration included in the configurations for report triggering for example, the measurement configuration may include multiple measurement IDs, the measurement object configuration, and so on, and only the configurations corresponding to part of the measurement IDs may be deleted.

Figure 5:
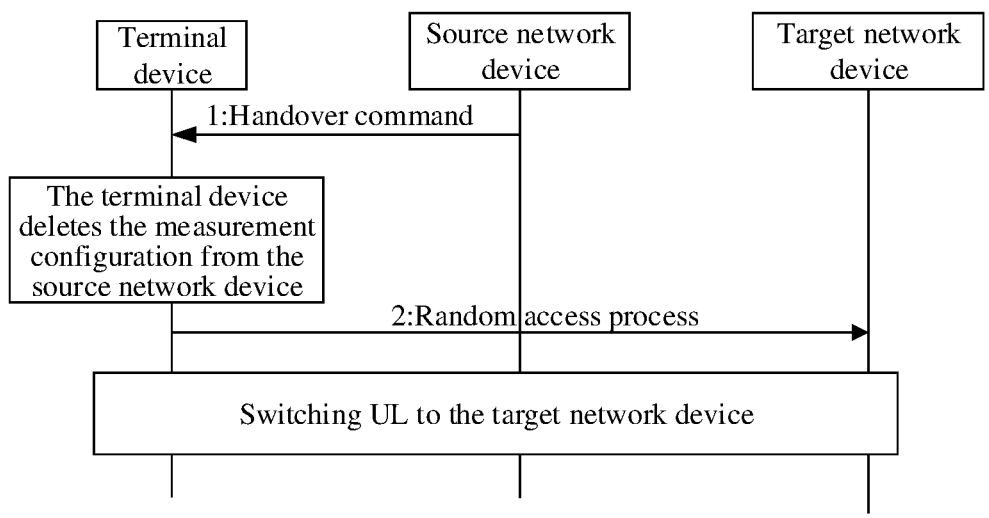
FIG. 5 is a third flowchart of an information processing method provided by an embodiment of the disclosure.

As shown in FIG. 5, the configurations for report triggering, which include the measurement configuration, is taken as an example. An example specifically includes the following operations.

First, the terminal device receives an HO command which is used for configuring the UE to perform dual active stack handover; then, the terminal device deletes the configuration for report triggering, for example, deleting the measurement configuration from the source network device.

The measurement configuration may include a measurement ID, a measurement object configuration, a measurement report configuration, etc. The measurement configuration may be all contents of measurement configuration variables maintained in the terminal device.

An example of the measurement configuration variables is shown below.

```
VarMeasConfig ::= SEQUENCE {
    -- Measurement identities
    measIdListMeasIdToAddModList OPTIONAL,
    -- Measurement objects
    measObjectListMeasObjectToAddModList OPTIONAL,
    -- Reporting configurations
    reportConfigListReportConfigToAddModList OPTIONAL,
    -- Other parameters
    quantityConfigQuantityConfig OPTIONAL
    ......
    }
    OPTIONAL
}
```

Second, the terminal device starts to initiate a random access to the target network device.

In this process, the terminal device may keep reception and transmission of data from and to the source network device while accessing the target network device. Since the configuration for report triggering, for example, the measurement configuration, is deleted, the terminal device does not perform the RRM measurement and report the corresponding measurement report.

At the same time, during the handover, the terminal device also needs to control to stop any RRC message uploaded using the SRB1/2/3 (that is, the DCCH), for example, the UE assistance information.

Finally, when the above solution is adopted, since the configuration from the source network device for report triggering is deleted, the terminal device may also reestablish a connection with the network device when the HO is failed. The specific processing of connection re-establishment is not described in the embodiment.

In an embodiment, after receiving the HO command, the terminal device may not perform the configuration from the source network device for report triggering.

Not performing the configuration from the source network device for report triggering may include one of the following: controlling the configuration from the source network device for report triggering to be disabled, laying up the configuration from the source network device for report triggering, and deactivating the configuration from the source network device for report triggering.

In this case, the configuration for report triggering configured by the source network device is not deleted but is retained, instead, the terminal device is controlled to not trigger reporting by deactivating, laying up or disabling the configuration for report triggering.

The UL control information may include the measurement report and the RRC message uploaded through the DCCH.

In addition, since the configuration from the source network device for report triggering is retained, if the terminal device fails to access the target network device, the terminal device may maintain the connection with the source network device, perform the configuration from the source network device for report triggering, and send the UL control information to the source network device.

That is, when the terminal device fails to switch to the target network device, the configuration from the source network device for report triggering may be reused, and then the corresponding UL control information may be generated based on the configuration from the source network device for report triggering and reported. Similarly, when the RRC message uploaded through the DCCH is triggered, the RRC message may be sent to the source network device through the DCCH.

The case that the configuration from the source network device for report triggering is reused may be that: the configuration from the source network device for report triggering is activated again, or the configuration from the source network device for report triggering is reused, or the configuration from the source network device for report triggering is disabled again.

In a possible mode, after the terminal device receives the HO command, all of the configurations from the source network device for report triggering may be controlled to be deactivated, disabled or laid up. In another implementation mode, only part of the configurations for report triggering may be deactivated, disabled or laid up after the terminal device receives the HO command, for example, when the configurations for report triggering include configurations for multiple cells, the configurations for part of the cells may be deactivated, disabled or laid up. The measurement configuration included in the configurations for report triggering is taken as an example. The measurement configuration may include multiple measurement IDs, a measurement object configuration, and so on. Only the configurations corresponding to part of the measurement IDs may be deactivated, disabled or laid up.

Figure 6:
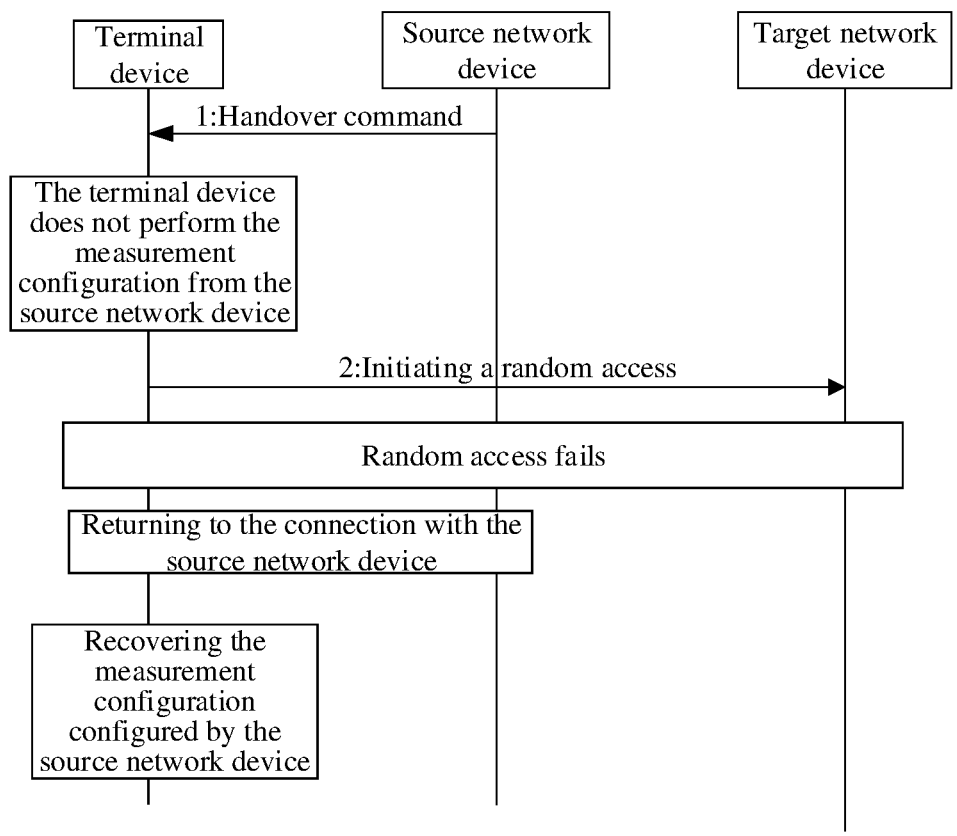
FIG. 6 is a fourth flowchart of an information processing method provided by an embodiment of the disclosure.

In an example, the configuration for report triggering may be the measurement configuration, as shown in FIG. 6.

First, the terminal device receives an HO command which is used for configuring the UE to perform dual active stack handover; then, the terminal device performs the measurement configuration from the source network device; for example, part of the configurations like measurement related configurations may be disabled/laid up/deactivated. The measurement related configuration is the same as the above and will not be repeated here.

Second, the terminal device initiates a random access to the target network device.

At this moment, the terminal device may keep reception and transmission of data from and to the source cell while accessing the target cell. Since the measurement configuration is not performed, the terminal device does not perform the RRM measurement and report the corresponding measurement report.

At the same time, the terminal device may stop any RRC message uploaded using the SRB1/2/3 (that is, the DCCH), for example, the UE assistance information.

In response to the terminal device failing to access the target cell, that is, failing to initiate the random access to the target network device, the terminal device may return to maintain the connection with the source network device, recover the configuration from the source network device, such as the measurement configuration, and perform relevant measurement, reporting and other processing, which will not be described here.

In an embodiment, processing may be performed based on the preset condition. Specifically, in response to the preset condition being met, the terminal device may not send the UL control information to the source network device.

The preset condition may include at least one of the followings: a measurement event configured by the source network device being satisfied; and uploading of the RRC message through the DCCH being triggered.

Correspondingly, the operation that in response to the preset condition being met, the terminal device does not send the UL control information to the source network device may include at least one of the followings:

in response to the measurement event configured by the source network device being satisfied by the terminal device, the terminal device does not generate a measurement report, or does not send the measurement report to the source network device; and in response to uploading of the RRC message through the DCCH being triggered by the terminal device, the terminal device stops sending the RRC message to the source network device through the DCCH.

That is, the configuration for report triggering may be still maintained, but the corresponding UL control information may not be generated based on the configuration for report triggering; or, although the UL control information is generated based on the configuration for report triggering, the generated UL control information may be controlled to be not sent to the source network device. Further, when the terminal device performs the handover during which connections with a source network device and a target network device are both maintained, the preset condition is met. For example, when the measurement event configured by the source network device is satisfied, it may be determined that the corresponding measurement report is not generated; or, the measurement report is generated, but the measurement report is controlled to be not sent. Other situations are not illustrated.

In a processing mode, all reports triggered by the configuration for report triggering may be controlled to be not generated or sent. In another mode, the UL control information reported and triggered based on part of the configurations for report triggering may be controlled to be not generated or sent, for example, only the UL control information triggered by the configuration from some cells for report triggering is not generated or sent. Taking that the configuration for report triggering is the measurement configuration for example, measurement reporting triggered in some ID measurements may be controlled to be not generated or sent.

Figure 7:
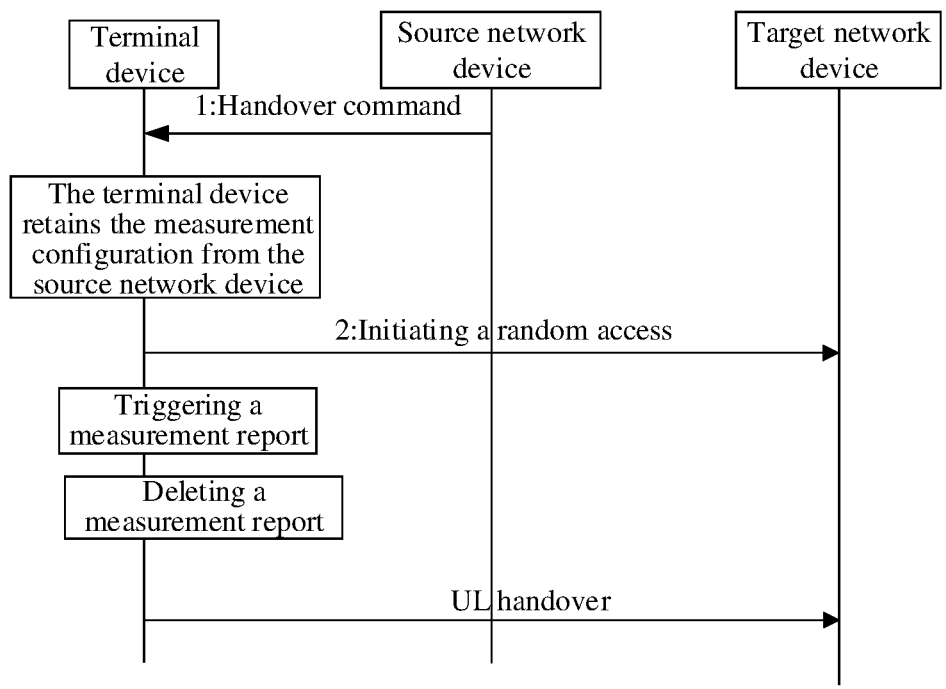
FIG. 7 is a fifth flowchart of an information processing method provided by an embodiment of the disclosure.

As shown in FIG. 7, an example includes the following operation.

The operations 1-2 include that the terminal device receives an HO command which is used for configuring the UE to perform dual active stack handover; the terminal device accesses the target cell based on the HO command, and keeps reception and transmission of data from and to the source cell; and the terminal device initiates a random access to the target network device.

In this case, the terminal device may retain the measurement configuration from the source network device, and perform the corresponding RRM measurement based on the configuration from the source network device. In response to the measurement event being satisfied, the UE does not generate the measurement report or does not send the measurement report to the source cell; in response to the UE triggering transmission of the UE assistance information, the UE stops transmitting the UE assistance information.

Since the configuration from the source network device for report triggering is retained, in response to the terminal device failing to access the target network device, the terminal device may maintain the connection with the source network device, perform the configuration from the source network device for report triggering, and send the UL control information to the source network device.

It can be seen that by using the above solutions, the terminal device can be controlled to not send the UL control information to the source network device when performing the handover during which connections with a source network device and a target network device are both maintained. In this way, the power consumption of the terminal device can be reduced by reducing the information sent to the source network device during the handover.

Figure 8:
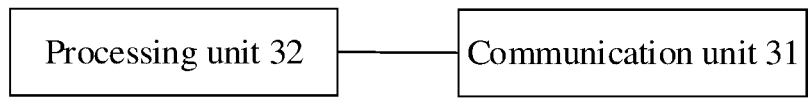
FIG. 8 is a composition structure diagram of a terminal device provided by an embodiment of the disclosure.

The embodiments of the disclosure provide a terminal device, as shown in FIG. 8, which may include: a communication unit 31.

The communication unit 31 is configured to receive an HO command for configuring the terminal device to perform a handover during which connections with a source network device and a target network device are both maintained, and not send the UL control information to the source network device.

The UL control information may include at least one of the followings: a measurement report, and a RRC message uploaded through the DCCH.

In the embodiment, the network device may be a base station on the network side, the source network device may be a source base station connected to the terminal device, and the target network device may be a target base station. The terminal device is a device that can maintain the connections with both the source network device and the target network device.

In an embodiment, the terminal device may be mainly applied to a situation where after a first UL grant sent by the target network device (that is, the target base station) is received, a UL PUSCH is switched to the target network device from the source network device.

Specifically, the terminal device may also include: a processing unit 32, configured to, in response to a preset condition being met, control the communication unit to not send the UL control information to the source network device.

The preset condition may include that: a UL being switched to the target network device.

The communication unit 31 is configured to access the target network device based on the HO command, and maintain reception and transmission of data between the terminal device and the source network device. The communication unit is further configured to, in response to the preset condition being not met, keep sending the UL control information to the source network device based on the configuration from the source network device for report triggering.

That is, after the HO command is sent to the terminal device, and before receiving the UL grant from the target network device, the terminal device may only keep the UL with the source network device, but not establish an UL with the target network device. In this case, in response to the preset condition being not met, the terminal device may keep sending the UL control information to the source network device.

The configuration from the source network device for report triggering may include a measurement configuration. Correspondingly, the UL control information may at least include a measurement report. The UL control information reported and triggered based on the configuration for report triggering may be carried by a DCCH logical channel or SRB 1 or SRB3.

Further, the terminal device may also include: a processing unit 32.

The processing unit 32 is configured to, in response to the UL being switched to the target network device, control the communication unit 31 to not send the UL control information to the source network device.

That is, after receiving the UL granted resource from the target network device, the terminal device may disconnect from the source network device, and switch the UL to the target network device. At this moment, the terminal device may be controlled to not send the UL control information to the source network device.

The UL control information may include at least one of the followings: a measurement report, and a RRC message uploaded through the DCCH. The case that the RRC message is not transmitted on the DCCH may be that UE assistance information is not transmitted, and so on. Other examples are not given here.

The operation that the UL control information is not sent to the source network device may have several possible implementation modes as follows.

In a first implementation mode, the processing unit 32 is configured to delete the configuration from the source network device for report triggering, for example, deleting a measurement configuration configured by the source network device. It should be pointed out that the deletion may be performed after the UL of the terminal device is switched to the target network device. In a possible example under this mode, all of the configurations for report triggering may be deleted after the UL of the terminal device is switched to the target network device. In another example, part of the configurations for report triggering may be deleted after the UL of the terminal device is switched to the target network device, for example, when the configurations for report triggering include configurations for multiple cells, the configurations for part of the cells may be deleted. Taking the measurement configuration included in the configurations for report triggering as an example, the measurement configuration may include multiple measurement IDs, a measurement object configuration, and so on. Only the configurations corresponding to part of the measurement IDs may be deleted.

In a second implementation mode, the processing unit 32 is configured to retain the configuration from the source network device for report triggering, but control to not generate corresponding UL control information, or to generate but not send the UL control information. In a possible example under this mode, all reports triggered by the configuration for report triggering may be controlled to be not generated or sent. In another example, the UL control information reported and triggered based on part of the configurations for report triggering may be controlled to be not generated or sent, for example, only the UL control information triggered by the configuration from some cells for report triggering is not generated or sent. Taking that the configuration for report triggering is the measurement configuration for example, measurement reporting triggered in some ID measurements may be controlled to be not generated or sent.

In a third implementation mode, the processing unit 32 is configured to retain the configuration from the source network device for report triggering, but after the UL of the terminal device is switched to the target network device, control the configuration from the source network device for report triggering to be deactivated, disabled or laid up. In this way, it can also be ensured that the configuration for report triggering is not performed, thereby ensuring that the UL control information is not generated, that is, the measurement report is not generated. In a possible example under this mode, after the UL of the terminal device is switched to the target network device, all of the configurations from the source network device for report triggering are controlled to be deactivated, disabled or laid up. In another example, only part of the configurations for report triggering are deactivated, disabled or laid up after the UL of the terminal device is switched to the target network device, for example, when the configurations for report triggering include the configurations for multiple cells, the configurations for part of the cells may be deactivated, disabled or laid up. Taking the measurement configuration included in the configurations for report triggering for example, the measurement configuration may include multiple measurement IDs, a measurement object configuration, and so on. Only the configurations corresponding to part of the measurement IDs may be deactivated, disabled or laid up.

In an embodiment, after receiving the HO command, the processing unit 32 is configured to delete the configuration from the source network device for report triggering.

Once receiving the HO command, the processing unit 32 is configured to delete the configurations from the source network device for report triggering, which may include the measurement configuration. In this way, since these configurations are deleted, the terminal device does not send the related UL control information to the source network device based on these configurations, thereby avoiding sending the measurement report.

It is to be noted that the UL control information reported and triggered based on the configuration for report triggering may be carried by the DCCH logical channel or the SRB 1 or SRB3.

In addition, the processing unit 32 is also configured to control to not send the RRC message, which may include UE assistance information, etc., to the source network device through the DCCH.

In a possible processing mode, the processing unit 32 may delete all of the configurations for report triggering. In another mode, the processing unit 32 may delete only part of the configurations for report triggering, for example, when the configurations for report triggering include the configurations for multiple cells, the configurations for part of the cells may be deleted. Taking the measurement configuration included in the configurations for report triggering for example, the measurement configuration may include multiple measurement IDs, a measurement object configuration, and so on. Only the configurations corresponding to part of the measurement IDs may be deleted.

In an embodiment, after receiving the HO command, the processing unit 32 is configured to not perform the configuration from the source network device for report triggering.

Not performing the configuration from the source network device for report triggering may include one of the followings: controlling the configuration from the source network device for report triggering to be disabled, laying up the configuration from the source network device for report triggering, and deactivating the configuration from the source network device for report triggering.

That is, the configuration for report triggering configured by the source network device is not deleted but retained, instead, the terminal device may be controlled to not trigger reporting by deactivating, laying up or disabling the configuration for report triggering.

The UL control information may include the measurement report and the RRC message uploaded through the DCCH.

In addition, since the configuration from the source network device for report triggering is retained, in response to failing to access the target network device, the communication unit 31 may maintain the connection with the source network device, perform the configuration from the source network device for report triggering, and send the UL control information to the source network device.

That is, when the terminal device fails to switch to the target network device, the configuration from the source network device for report triggering may be reused, and then corresponding UL control information may be generated based on the configuration from the source network device for report triggering and reported. Similarly, in response to the RRC message uploaded through the DCCH being triggered, the RRC message may be sent to the source network device through the DCCH.

The case that the configuration from the source network device for report triggering is reused may be that: the configuration from the source network device for report triggering is activated again, or the configuration from the source network device for report triggering is reused, or the configuration from the source network device for report triggering is enabled again.

In a mode, after the terminal device receives the HO command, the processing unit 32 is configured to control all of the configurations from the source network device for report triggering to be deactivated, disabled or laid up. In another implementation mode, the processing unit 32 may deactivate, disable or lay up only part of the configurations for report triggering after the terminal device receives the HO command. For example, when the configurations for report triggering include the configurations for multiple cells, the configurations for part of the cells may be deactivated, disabled or laid up. Taking the measurement configuration included in the configurations for report triggering for example, the measurement configuration may include multiple measurement IDs, the measurement object configuration, and so on. Only the configurations corresponding to part of the measurement IDs may be deactivated, disabled or laid up.

In an embodiment, the configuration for report triggering may be not deleted or disabled, but only the triggered reporting is processed. The preset condition may include at least one of the followings:

the measurement event configured by the source network device being satisfied, and uploading of the RRC message through the DCCH being triggered.

Specifically, the processing unit 32 is configured to perform at least one of the followings:

in response to the measurement event configured by the source network device being satisfied, not generating the measurement report, or controlling the communication unit 31 to not send the measurement report to the source network device; in response to uploading of the RRC message through the DCCH being triggered, controlling the communication unit 31 to stop sending the RRC message to the source network device through the DCCH.

That is, the configuration for report triggering may be still maintained, but the corresponding UL control information may not be generated based on the configuration for report triggering; or, although the UL control information is generated based on the configuration for report triggering, the generated UL control information may be controlled to be not sent to the source network device.

In a processing mode, the processing unit 32 may control all reports triggered by the configuration for report triggering to not be generated or sent. In another mode, the processing unit 32 may control the UL control information reported and triggered by part of the configurations for report triggering to not be generated or sent. For example, only the UL control information triggered by the configuration from some cells for report triggering is not generated or sent. Taking the case that the configuration for report triggering is the measurement configuration for example, measurement reporting triggered in some measurement IDs may be controlled to be not generated or sent.

It can be seen that based on the above solutions, the terminal device can be controlled to not send the UL control information to the source network device when performing handover during which connections with a source network device and a target network device are both maintained. In this way, the power consumption of the terminal device can be reduced by reducing the information sent to the source network device during handover.

Figure 9:
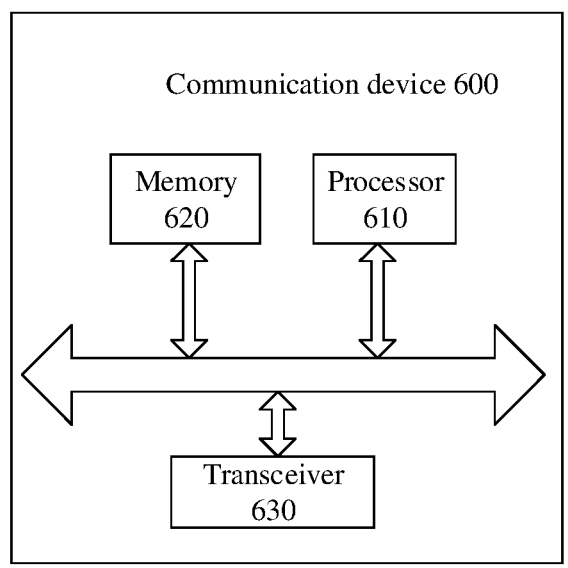
FIG. 9 is a composition structure diagram of a communication device provided by an embodiment of the disclosure.

FIG. 9 is a structural schematic diagram of a communication device 600 provided by an embodiment of the disclosure. The communication device in the embodiment may be specifically the network device or terminal device in the above embodiments. The communication device 600 shown in FIG. 9 includes a processor 610. The processor 610 may call a computer program from a memory and run the program, to implement the method in the embodiments of the disclosure.

Optionally, as shown in FIG. 9, the communication device 600 may further include a memory 620. The processor 610 may call and run the computer program in the memory 620 to implement the method in the embodiments of the disclosure.

The memory 620 may be a separate device independent of the processor 610, and may also be integrated in the processor 610.

Optionally, as shown in FIG. 9, the communication device 600 may further include a transceiver 630, and the processor 610 may control the transceiver 630 to communicate with another device, specifically sending information or data to the other device or receiving information or data sent by the other device.

The transceiver 630 may include a transmitter and a receiver. The transceiver 630 may further include an antenna. The number of the antenna may be one or more.

Optionally, the communication device 600 may specifically be the network device of the embodiments of the disclosure, and the communication device 600 may implement corresponding flows implemented by the network device in each method of the embodiments of the disclosure. For simplicity, elaborations are omitted herein.

Optionally, the communication device 600 may specifically be the terminal device or the network device in the embodiments of the disclosure, and the communication device 600 may implement corresponding flows implemented by the mobile terminal/terminal device in the method of the embodiments of the disclosure. For simplicity, elaborations are omitted herein.

Figure 10:
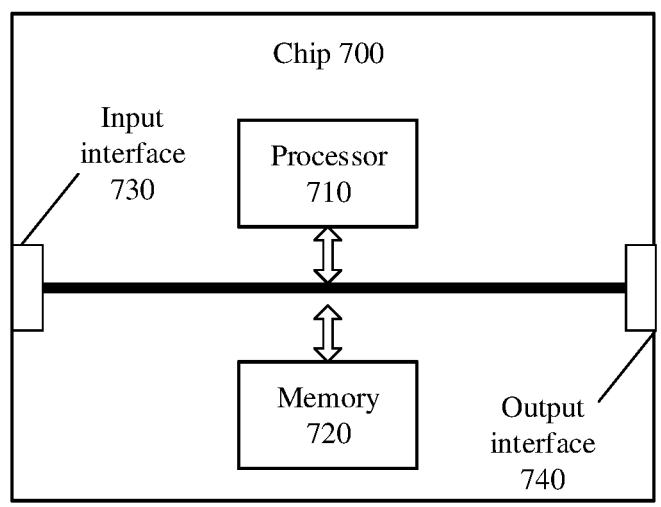
FIG. 10 is a schematic block diagram of a chip provided by an embodiment of the disclosure.

FIG. 10 is a schematic structure diagram of a chip according to an embodiment of the disclosure. The chip 700 shown in FIG. 10 includes a processor 710, and the processor 710 may call and run a computer program in a memory to implement the method in the embodiments of the disclosure.

Optionally, as shown in FIG. 10, the chip 700 may further include the memory 720. The processor 710 may call and run the computer program in the memory 720 to implement the method in the embodiments of the disclosure.

The memory 720 may be a separate device independent of the processor 710, and may also be integrated in the processor 710.

Optionally, the chip 700 may further include an input interface 730. The processor 710 may control the input interface 730 to communicate with other devices or chips; specifically, the input interface may acquire information or data sent by other devices or chips.

Optionally, the chip 700 may further include an output interface 740. The processor 710 may control the output interface 740 to communicate with other devices or chips; specifically, the output interface may output information or data to other devices or chips.

Optionally, the chip may be implemented by the network device of the embodiments of the disclosure, and the chip may implement corresponding flows implemented by the terminal device in each method of the embodiments of the disclosure. For simplicity, elaborations are omitted herein.

It is to be understood that the chip mentioned in the embodiment of the disclosure may also be called a system-level chip, a system chip, a chip system or a system on chip, etc.

It is to be understood that the processor in the embodiment of the disclosure may be an integrated circuit chip and has a signal processing capability. In an implementation process, each operation of the method embodiment may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, operation and logical block diagram disclosed in the embodiments of the disclosure may be implemented or executed. The universal processor may be a microprocessor, or the processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as an RAM, a flash memory, an ROM, a PROM or EEPROM and a register. The storage medium is located in a memory, and the processor reads information in the memory, and completes the operations of the methods in combination with hardware.

It may be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the memories above mentioned are exemplarily but unlimitedly described; for example, the memories in the embodiments of the disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). That is, the memories in the embodiments of the disclosure are intended to include, but not limited to, memories of these and any other proper types.

Figure 11:
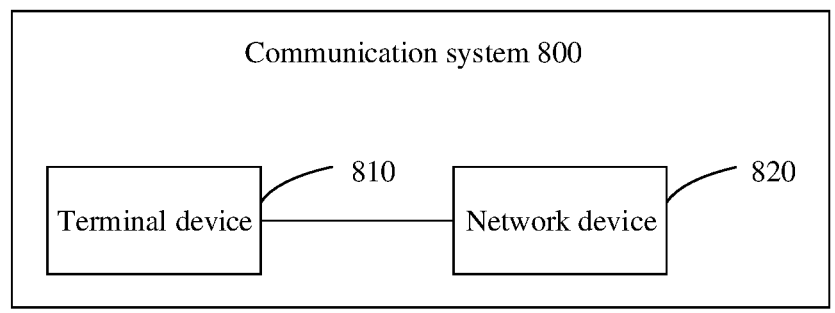
FIG. 11 is a second schematic diagram of a communication system architecture according to an embodiment of the disclosure.

FIG. 11 is a schematic block diagram of a communication system 800 according to an embodiment of the disclosure. As illustrated in FIG. 11, the communication system 800 includes the terminal device 810 and the network device 820.

The terminal device 810 may be configured to realize corresponding functions realized by the UE in the method, and the network device 820 may be configured to realize corresponding functions realized by the network device in the method. For simplicity, elaborations are omitted herein.

The embodiments of the disclosure also provide a computer-readable storage medium, which is configured to store a computer program.

Optionally, the computer-readable storage medium may be implemented by the network device or terminal device in the embodiments of the disclosure, and the computer program enables a computer to execute corresponding flows implemented by the network device in each method of the embodiments of the disclosure. For simplicity, elaborations are omitted herein.

The embodiments of the disclosure also provide a computer program product, which includes a computer program instruction.

Optionally, the computer program product may be implemented by the network device or terminal device in the embodiments of the disclosure, and the computer program instruction enables a computer to execute corresponding flows implemented by the network device in each method of the embodiments of the disclosure. For simplicity, elaborations are omitted herein.

The embodiments of the disclosure also provide a computer program.

Optionally, the computer program may be executed by the network device or terminal device in the embodiments of the disclosure, and the computer program runs in a computer to enable the computer to execute corresponding flows implemented by the network device in each method of the embodiments of the disclosure. For simplicity, elaborations are omitted herein.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific disclosures and design constraints of the technical solutions. Professionals may realize the described functions for each specific disclosure by use of different methods, but such realization shall fall within the scope of the disclosure.

Those skilled in the art may clearly learn about that specific operations of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

Moreover, all the function units in the embodiments of the disclosure may be integrated in a processing unit; or the units exist separately and physically; or two or more than two units are integrated in a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including multiple instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation modes of the disclosure and not intended to limit the protection scope of the disclosure; any change or replacement that those skilled in the art can think of easily in the scope of technologies disclosed by the disclosure shall fall within the protection scope of the disclosure. So, the protection scope of the disclosure is subject to the protection scope of the claims.

What is claimed is:

1. An information processing method, implemented by a terminal device, comprising:
receiving, by a terminal device, a handover (HO) command for configuring the terminal device to perform handover during which connections with a source network device and a target network device are both maintained; and
in response to an uplink (UL) of the terminal device being switched to the target network device, not sending, by the terminal device, UL control information to the source network device,
wherein in response to the UL of the terminal device being switched to the target network device, not sending, by the terminal device, the UL control information to the source network device comprises:
retaining configurations for multiple cells from the source network device for report triggering, wherein the configurations for multiple cells at least comprise measurement IDs of the multiple cells; and
laying up only the configurations corresponding to part of the measurement IDs of the multiple cells from the source network device for report triggering, after the UL of the terminal device is switched to the target network device.

2. The method of claim 1, wherein the UL control information comprises at least one of followings: a measurement report, and a radio resource control (RRC) message uploaded through a dedicated control channel (DCCH).

3. The method of claim 1, further comprising:
accessing, by the terminal device, the target network device based on the HO command, and maintaining reception and transmission of data between the terminal device and the source network device;
in response to the UL of the terminal device being not switched to the target network device, keeping sending, by the terminal device, the UL control information to the source network device based on the configurations from the source network device for report triggering.

4. The method of claim 1, further comprising:
in case of failing to access the target network device, maintaining, by the terminal device, the connection with the source network device, performing the configurations from the source network device for report triggering, and sending the UL control information to the source network device.

5. A terminal device, comprising:
a transceiver, configured to: receive a handover (HO) command for configuring the terminal device to perform handover during which connections with a source network device and a target network device are both maintained; and
a processor, configured to: in response to an uplink (UL) of the terminal device being switched to the target network device, control the transceiver to not send UL control information to the source network device,
wherein the processor is further configured to:
retain configurations for multiple cells from the source network device for report triggering, wherein the configurations for multiple cells at least comprise measurement IDs of the multiple cells; and
lay up only the configurations corresponding to part of the measurement IDs of the multiple cells from the source network device for report triggering after the UL of the terminal device is switched to the target network device.

6. The terminal device of claim 5, wherein the UL control information comprises at least one of followings: a measurement report, and a radio resource control (RRC) message uploaded through a dedicated control channel (DCCH).

7. The terminal device of claim 5, wherein the transceiver is configured to access the target network device based on the HO command, and maintain reception and transmission of data between the terminal device and the source network device; the transceiver is further configured to, in response to the UL of the terminal device being not switched to the target network device, keep sending the UL control information to the source network device based on the configurations from the source network device for report triggering.

8. The terminal device of claim 5, wherein the transceiver is configured to:
in case of failing to access the target network device, maintain the connection with the source network device, perform the configurations from the source network device for report triggering, and send the UL control information to the source network device.

* * * * *